United States Patent
Mohajer et al.

(10) Patent No.: US 12,361,222 B2
(45) Date of Patent: *Jul. 15, 2025

(54) INTERPRETING QUERIES ACCORDING TO PREFERENCES

(71) Applicant: SoundHound AI IP, LLC, Santa Clara, CA (US)

(72) Inventors: Keyvan Mohajer, Los Gatos, CA (US); Bernard Mont-Reynaud, Sunnyvale, CA (US); Christopher S. Wilson, Santa Clara, CA (US)

(73) Assignee: SoundHound AI IP, LLC, Santa Clara, CA (US)

( * ) Notice: Subject to any disclaimer, the term of this patent is extended or adjusted under 35 U.S.C. 154(b) by 958 days.

This patent is subject to a terminal disclaimer.

(21) Appl. No.: 17/389,847

(22) Filed: Jul. 30, 2021

(65) Prior Publication Data

US 2021/0357594 A1 Nov. 18, 2021

Related U.S. Application Data

(63) Continuation of application No. 15/942,875, filed on Apr. 2, 2018, now Pat. No. 11,113,473.

(51) Int. Cl.
*G06F 40/00* (2020.01)
*G06F 40/30* (2020.01)
(Continued)

(52) U.S. Cl.
CPC .......... *G06F 40/30* (2020.01); *G10L 15/1815* (2013.01); *G10L 15/22* (2013.01); *G10L 15/30* (2013.01); *G10L 2015/223* (2013.01)

(58) Field of Classification Search
CPC ............. G10L 15/083; G10L 2015/085; G10L 2015/088; G10L 15/16; G10L 15/18;
(Continued)

(56) References Cited

U.S. PATENT DOCUMENTS 11,113,473 B2 * 9/2021 Wilson ................... G06F 40/30
2014/0163959 A1 6/2014 Hebert et al.
(Continued)

FOREIGN PATENT DOCUMENTS

CN 101689267 3/2010
CN 103226949 A 7/2013
(Continued)

OTHER PUBLICATIONS

L. Lengyel et al., "ICT in road vehicles—The VehicleICT platform," 2015 International Conference on Models and Technologies for Intelligent Transportation Systems (MT-ITS), Budapest, Hungary, 2015, pp. 457-462, doi: 10.1109/MTITS.2015.7223294. (Year: 2015).*

(Continued)

*Primary Examiner* — Edgar X Guerra-Erazo
(74) *Attorney, Agent, or Firm* — Pearl Cohen Zedek Latzer Baratz LLP

(57) ABSTRACT

The present invention extends to methods, systems, and computer program products for interpreting queries according to preferences. Multi-domain natural language understanding systems can support a variety of different types of clients. Queries can be received and interpreted across one or more domains. Preferred query interpretations can be identified and query responses provided based on any of: domain preferences, preferences indicated by an identifier, or (e.g., weighted) scores exceeding a threshold.

16 Claims, 12 Drawing Sheets

(51) Int. Cl.
*G10L 15/18* (2013.01)
*G10L 15/22* (2006.01)
*G10L 15/30* (2013.01)

(58) Field of Classification Search
CPC ............. G10L 15/1815; G10L 15/1822; G10L 15/183; G10L 15/193; G10L 15/19; G10L 15/20; G10L 2015/221; G10L 15/222; G10L 2015/223; G10L 2015/225; G10L 2015/228; G10L 15/26; G10L 15/30; G10L 15/32; G10L 15/34; G10L 15/285; G06F 40/00; G06F 40/117; G06F 40/10; G06F 40/20; G06F 40/205; G06F 40/216; G06F 40/274; G06F 40/284; G06F 40/35; G06F 40/30; G06F 40/253
See application file for complete search history.

(56) References Cited

U.S. PATENT DOCUMENTS

| | | | |
|---|---|---|---|
| 2015/0302002 A1* | 10/2015 | Mathias | G06F 40/56 704/9 |
| 2016/0117393 A1 | 4/2016 | von Rickenbach et al. | |
| 2018/0012597 A1 | 1/2018 | Mathias et al. | |
| 2019/0164553 A1* | 5/2019 | Leeb | G10L 15/02 |

FOREIGN PATENT DOCUMENTS

| | | |
|---|---|---|
| CN | 104049989 | 9/2014 |
| CN | 107491469 | 12/2017 |
| CN | 107533542 A | 1/2018 |
| JP | 2010517146 A | 5/2010 |
| WO | WO2007088877 A1 | 8/2007 |

OTHER PUBLICATIONS

Kim Y, Oh H, Kang S. Proof of Concept of Home IoT Connected Vehicles. Sensors (Basel). Jun. 5, 2017;17(6):1289. doi: 10.3390/s17061289. PMID: 28587246; PMCID: PMC5492362. (Year: 2017).*

English language abstract for CN101689267 published Mar. 31, 2010.

English language abstract for CN104049989 published Sep. 17, 2014.

English language abstract for CN107491469 published Dec. 19, 2017.

* cited by examiner

| enable | weight | domain name | description |
|---|---|---|---|
| ✓ | 2.5 | Weather | Answers queries about weather |
| ✓ | 1.5 | Date / Time | Date and time query services |
|  | 1.0 | Timer | Set and modify timers |
| ✓ | 2.0 | Calendar | Manage a personal calendar |
|  | 1.0 | Alarm | Set and modify alarms |
|  | 1.0 | Email | Read, compose, send emails |
| ✓ | 0.9 | SMS | Receive and send SMS texts |
| ✓ | 0.9 | Phone | Make and answer phone calls |
| ✓ | 9.9 | Navigation | Auto navigation services |
| ✓ | 7.5 | Music | Search, play, and control music |
|  | 1.0 | Sports | Live sports information and stats |
| ✓ | 0.75 | Stocks | Investment information |
|  | 1.0 | Flights | Flights status and booking |
| ✓ | 0.8 | Hotels | Hotel reservations |
|  | 1.0 | Video | Movies and television shows |
| ✓ | 0.2 | Wikipedia | General knowledge answers |

FIG. 8

INTERPRETING QUERIES ACCORDING TO PREFERENCES

CROSS-REFERENCE TO RELATED APPLICATIONS

This application claims priority to U.S. non-provisional patent application Ser. No. 15/942,875, titled Interpreting Expressions Having Potentially Ambiguous Meanings In Different Domains, and filed on 2018 Apr. 2.

BACKGROUND

1. Field of the Invention

This invention relates generally to virtual assistants, and, more particularly, to virtual assistants configured to understand natural language.

2. Related Art

Modern virtual assistants can answer questions and carry out commands expressed using natural language. More advanced virtual assistants can handle questions and commands in many domains. Domains are distinct sets of related capabilities, such as providing information relevant to a particular field or performing actions relevant to a specific device. For example, some virtual assistants can give the weather forecast, answer questions with facts from Wikipedia, play requested music, play requested videos, send short message service (SMS) messages, make phone calls, etc. Different virtual assistants can be developed to handle questions and commands in different combinations of domains.

In some environments, virtual assistants run on a server that supports multiple different types of clients, such as, for example, smart speakers, mobile phones, automobiles, vending machines, etc. Each different type of client can provide a virtual assistant configured to handle questions and commands across a set of domains. The number of domains can vary from as few as a single domain for very specialized virtual assistants to multiple domains for broadly useful virtual assistants. Domains may be unique to a virtual assistant or shared among multiple virtual assistants. For example, many virtual assistants can use a common weather domain. On the other hand, a virtual assistant for a retailer may have a unique domain to answer queries about items in stock.

At times, a virtual assistant can receive a natural language expression that is potentially ambiguous. That is, the expression potentially makes sense in more than one domain. For example, a user uttering the verbal expression "play footloose", could refer to a popular song in a music domain and a popular movie in a video domain. The expression, "播放情深深雨蒙蒙" could refer to a popular song in a music domain and a popular movie in a video domain. For another example, the expression, "how high is mount everest" ("播放情深深雨蒙蒙") could refer to a height in a geography domain or a temperature in a weather domain.

Upon receiving an expression, a virtual assistant can compute a score for each of a plurality of different domains that roughly indicates how well the expression makes sense in that domain. The virtual assistant chooses the domain with the best score and uses interpretation from that domain to produce a response for the user. For potentially ambiguous expressions, multiple domains may provide high scores. However, the best (highest) scoring domain may not be the domain that the user intended process the potentially ambiguous expression. As a result, the virtual assistant gives an inappropriate response, which frustrates the user.

BRIEF DESCRIPTION OF THE DRAWINGS

The specific features, aspects, and advantages of the present invention will become better understood with regard to the following description and accompanying drawings where:

FIG. 8 illustrates an example Graphical User Interface (GUI) configurator screen.

DETAILED DESCRIPTION

Figure 1:
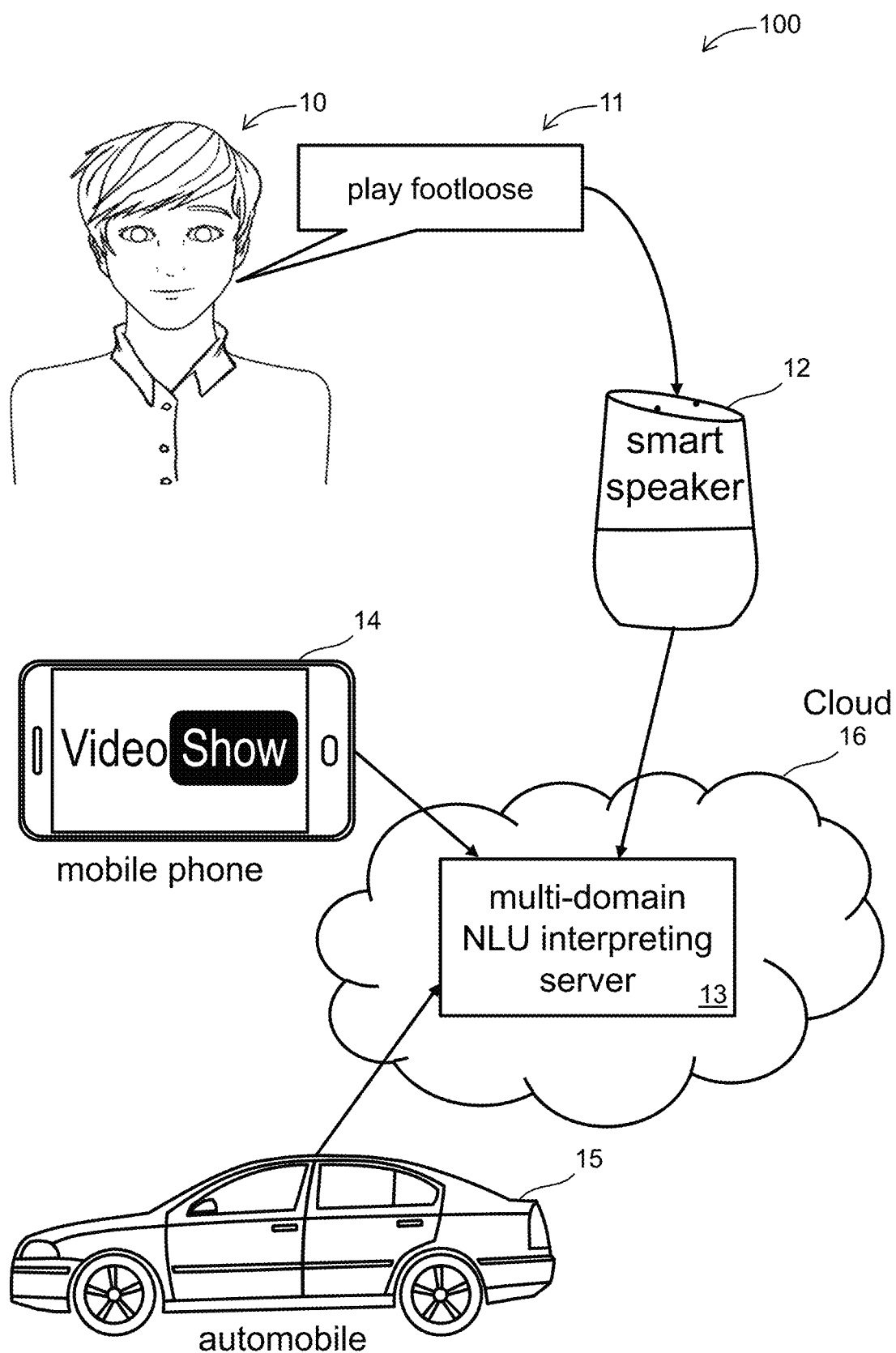
FIG. 1 illustrates an example computer environment for interpreting an expression.

The present invention extends to methods, systems, machines, manufacture products, and computer program products for interpreting expressions having potentially ambiguous meanings in different domains Aspects of the invention can weight and/or prioritize different interpretations of an expression provided by different domains. Weighting and/or prioritizing can be used to select a more appropriate interpretation of an expression for a user. Weighting and/or prioritizing can thus allow developers to develop virtual assistants for specific uses and for use in specific conditions to make the virtual assistants more likely to choose appropriate (correct) interpretations based on user intent. Weighting and/or prioritizing can also provide an advantage of allowing developers to decrease the likelihood of, and potentially prevent, users from getting results from competitors' domains.

In some aspects, an interpreter is configured to handle expressions across a plurality of different domains. The interpreter receives an expression from a user. The expression can be text (e.g., American Standard Code for Information Interchange (ASCII) characters or Unicode characters), tokenized sequences of morphemes, speech audio samples, etc. entered by a user. Speech recognition can be used to extract sequences of morphemes from speech audio samples.

The interpreter interprets the expression in each domain to compute a first likelihood score for the expression in each domain. The interpreter uses metadata associated with the expression to select a corresponding weight for each domain. In some aspects, metadata includes one or more of: a client ID, a vendor ID, a product ID, a version, a user ID, a location, sensor information, etc. In these aspects, an interpreter selects weights based on contents of the metadata. In other aspects, weights are included in metadata. In these other aspects, the metadata can specify a domain name or domain ID associated with each weight. Weights can be represented as integers, floating point numbers, or other symbolic representations.

For each domain, the interpreter applies the corresponding weight to the first likelihood score to compute a second likelihood score. The second likelihood scores are useful for selecting a domain, from among the plurality of domains, to provide an interpretation of the expression. For example, a domain having a second score exceeding a threshold can be selected as the domain to interpret the expression. A selected domain can be used to determine user intent and compute an appropriate response. Responses can be visual or audible (e.g., a sound or spoken information) and can cause a device to perform an operation, such as sending text or audible messages, etc.

Developers can develop interpreters (e.g., using a platform with a graphical user interface) that include different domains from among a plurality of available domains and can assign a weight to each included domain.

Alternately or in combination with the use of weights, aspects of the invention can also utilize domain ranks. If multiple domains have a score exceeding a threshold, a higher ranked domain can be selected as the domain to interpret an expression. Thresholds can be the same or different among different domains. Ranks can be specified as an ordered list, as pairs of domains with preferences, based on context (e.g., what applications are running, recent preceding dialog subjects, etc.). In one aspect, a rank is specified for "other" domains that are not otherwise expressly ranked.

Aspects include cloud-based multi-domain Natural Language Understanding (NLU) interpreting platforms that support multiple client types. Client developers can develop clients that use other's domains and/or can develop customer or proprietary domains for their clients. For example, a car maker might develop a proprietary car control domain that adjusts the heater and windows for their cars. The car maker can also develop a client that uses the proprietary car control domain as well as other commonly used domains, such as, domains that answer weather forecast queries. A client developer can assign higher weights to their own custom or propriety domains.

A client developer may also have a business relationship with a domain developer. The client developer can assign higher weights to domains from the domain developer or can assign lower weights (or even a zero weight) to domains from competitors of the domain developer. Accordingly, the client developer can essentially prevent the client from selecting competitor domains for responding to expressions or allowing competitor domains to respond to expressions of little relevance to the client For example, a grocery shopping client from a grocery store company may have a custom domain that includes information specific to their products. Using weights, the grocery shopping client can be configured to respond to food-related queries using the custom domain for products having a store brand. For example, the customer domain can be selected to respond to a query "how much energy is in a doughnut" with specific information about their store brand of doughnuts. The custom domain can be selected instead of a domain for a brand name doughnut company. The client can respond to food-related queries for products not having a store brand with a domain for general nutritional information. For example, a common domain can be selected to respond to a query "how many calories in a banana" when the store doesn't have a store brand for bananas.

Aspects of the present invention provide certain advantages that are improvements over conventional approaches. Specifically, ambiguous expressions are interpreted with a greater probability of matching a user's intent. Certain expressions can be understood that otherwise wouldn't. The behavior of devices is optimized for their type and their situation. Users are better satisfied with the natural language interfaces of devices. Shared cloud-based interpretation servers can provide different levels of service to different device developers (and charge different pricing levels). Furthermore, more accurate interpretation of natural language expressions is valuable for decreasing error rates in safety-critical systems. Other advantages of the present invention will be apparent to practitioners in the art.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes random access memory (RAM), read-only memory (ROM), electrically erasable programmable read-only memory (EEPROM), compact disc read-only memory (CD-ROM), solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or Peripheral Component Interconnect eXtended (PCI-X) based real-time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, personal digital assistants (PDAs), tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of hardware, software, firmware, digital components, or analog components. For example, one or more application specific integrated circuits (ASICs) can be manufactured or field programmable gate arrays (FPGAs) programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

FIG. 1 illustrates a computer environment 100 for interpreting an expression. More specifically, computer environment 100 depicts user interaction with a client connected to a cloud-based multi-domain natural language understanding ("NLU") interpreting server.

User 10 can speak verbal expression 11 within sensor range of smart speaker 12. Smart speaker 12 can receive verbal expression 11 and send verbal expression 11 over a network to multi-domain NLU interpreting server 13 in cloud 16. Mobile phone client 14 and automobile client 15 can also send natural language expressions to multi-domain NLU interpreting server 13.

As depicted, verbal expression 11 can be the phrase "play footloose" "播放情深深雨蒙蒙". The phrase "play footloose" "播放情深深雨蒙蒙" can indicate both the name of a popular video and the name of a popular song. As such, the phrase "play footloose" "播放情深深雨蒙蒙" may receive high scores for interpretation in both a song domain and a video domain. However, since smart speaker 12 has no visual display, higher weight can be given to the song domain relative to the video domain. Thus, the phrase "play footloose" "播放情深深雨蒙蒙" received from smart speaker 12 can be interpreted as a request to play a song.

On the other hand, a client with a display, such as mobile phone 14, might give a higher weight to a video domain than to a song domain. Thus, the phrase "play footloose" "播放情深 深雨蒙蒙" received from mobile phone 14 can be interpreted as a request to play a video.

Figure 2:
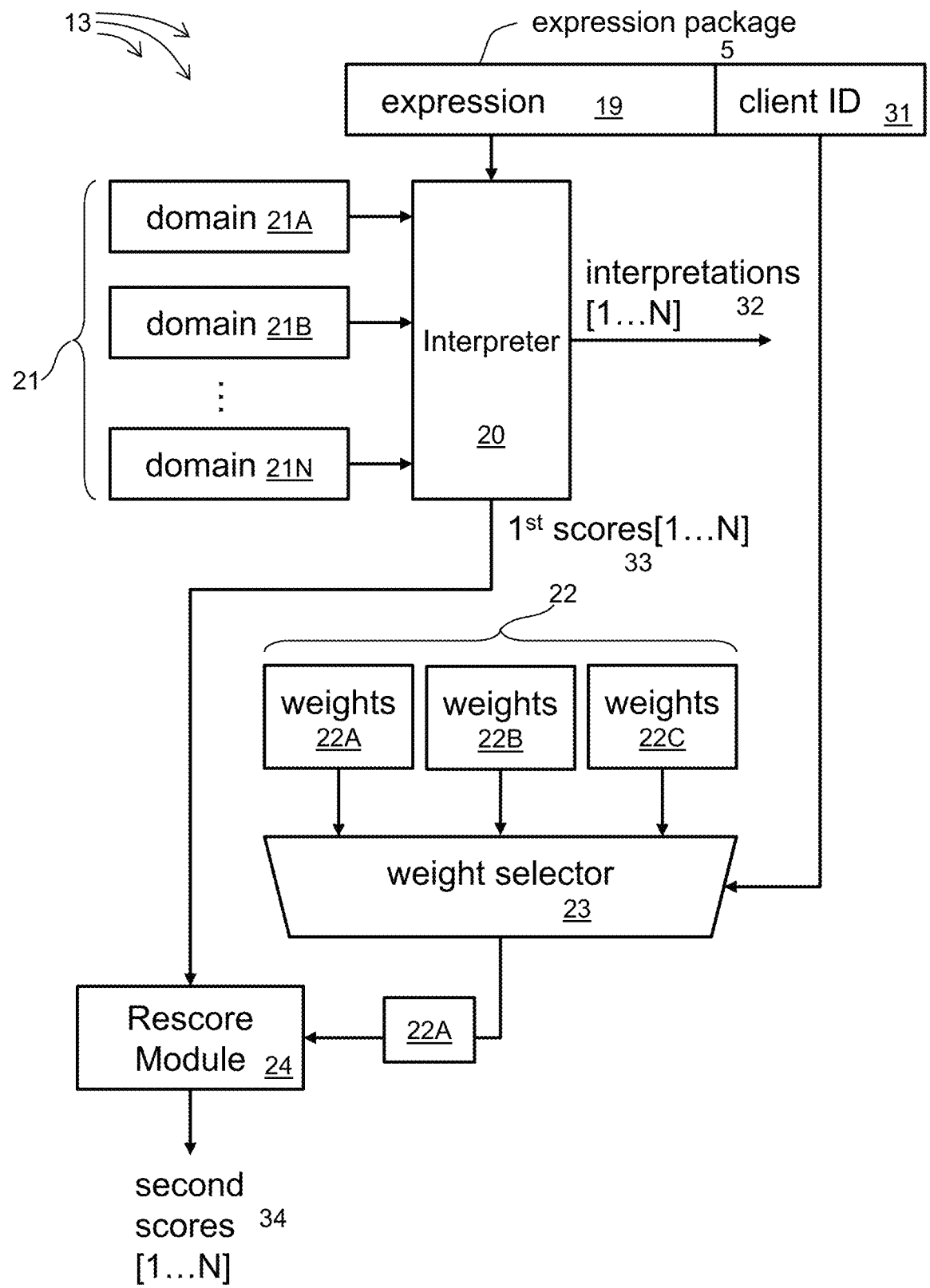
FIG. 2 illustrates an example of interpreting an expression at a multi-domain natural language understanding (NLU) interpreting server.

Some clients, such as mobile phone 14 or automobile 15, can run different kinds of applications. On these clients, running applications can be used to determine relative domain weights that favor songs or videos. For example, if mobile phone 14 has a music application in the foreground, domain weights can be configured to favor playing a song.
Stored Domain Weights FIG. 2 illustrates a more detailed view of a multi-domain natural language understanding (NLU) interpreting server 13. Multi-domain natural language understanding (NLU) interpreting server 13 can receive expression package 5 from a client device, such as, for example, from any of smart speaker 12, mobile phone 14, or automobile 15. Multi-domain natural language understanding (NLU) interpreting server 13 forwards expression 19 to interpreter 20 and forwards client ID 31 to weight selector 23. Interpreter 20 interprets expression 19 according to each of domains 21 (e.g., domain 21A, domain 21B ... domain 21N) to produce interpretations 32 1-N. In some aspects, interpreter 20 produces interpretations for less than all of domains 21. Interpreter 20 also produces first scores 33 1-N. Each of first scores 33 corresponds to one of interpretations 32. In some aspects, scoring is performed prior to completing interpretations of expression 19. Scoring prior to interpretation can save processing resources. Interpreter 20 can send first scores 33 1-N to rescore module 24.

Weight selector 23 has access to multiple sets of weights 22 (possibly stored in durable storage), including weights 22A, 22B, and 22C. A weight set can include a weight for one or more or possibly all of domains 21. Weights in a weight set can be represented as floating-point numbers, integers, text, or as other appropriate formats.

Weight selector 23 receives client ID 31. In one aspect, the client device that received expression 19, sends client ID 31 as metadata along with expression 19 to multi-domain natural language understanding (NLU) interpreting server 13. Multi-domain natural language understanding (NLU) interpreting server 13 separates client ID 31 from expression 19 and forwards client ID 31 to weight selector 23. Client ID 31 can represent a client type, such as, for example, smart speaker, mobile phone, automobile, etc. Weight selector 23 selects a weight set, such as, for example, weights 22A, corresponding to client ID 31. Weight selector 23 can send weights 22A to rescore module 24.

Other types of identifying data, such as, for example, a vendor ID, a product ID, a version, a user ID, a location, sensor information, etc. can also be transferred to weight selector 23. Weight selector 23 can use any of the described types of identifying data to select a weight set.

Rescore module 24 receives first scores 33 1-N from interpreter 20 and weights 22A from weight selector 23. Rescore module 24 applies weights 22A to first scores 33 1-N to produce second scores 34 1-N. Rescoring can include multiplying a first score by a corresponding weight (or a value 1 for scores that have no associated weight) to produce a second score. Other rescoring mechanisms, such as addition, adding to logarithms, threshold comparisons, filtering, and application of arbitrary functions can also be used.

Based on second scores 34 1-N, multi-domain natural language understanding (NLU) interpreting server 13 can select an appropriate interpretation of expression 19 (e.g., an interpretation with the highest score, an interpretation that exceeds a threshold for a corresponding domain, etc.) from among interpretations 32 1-N. Based on the selected appropriate interpretation, multi-domain natural language understanding (NLU) interpreting server 13 can generate an appropriate response to expression 19. An appropriate response can include causing the client device to perform an operation, such as outputting text or audible messages, playing a song, playing a video, moving, etc.

Receiving Domain Weights as Metadata

Figure 3:
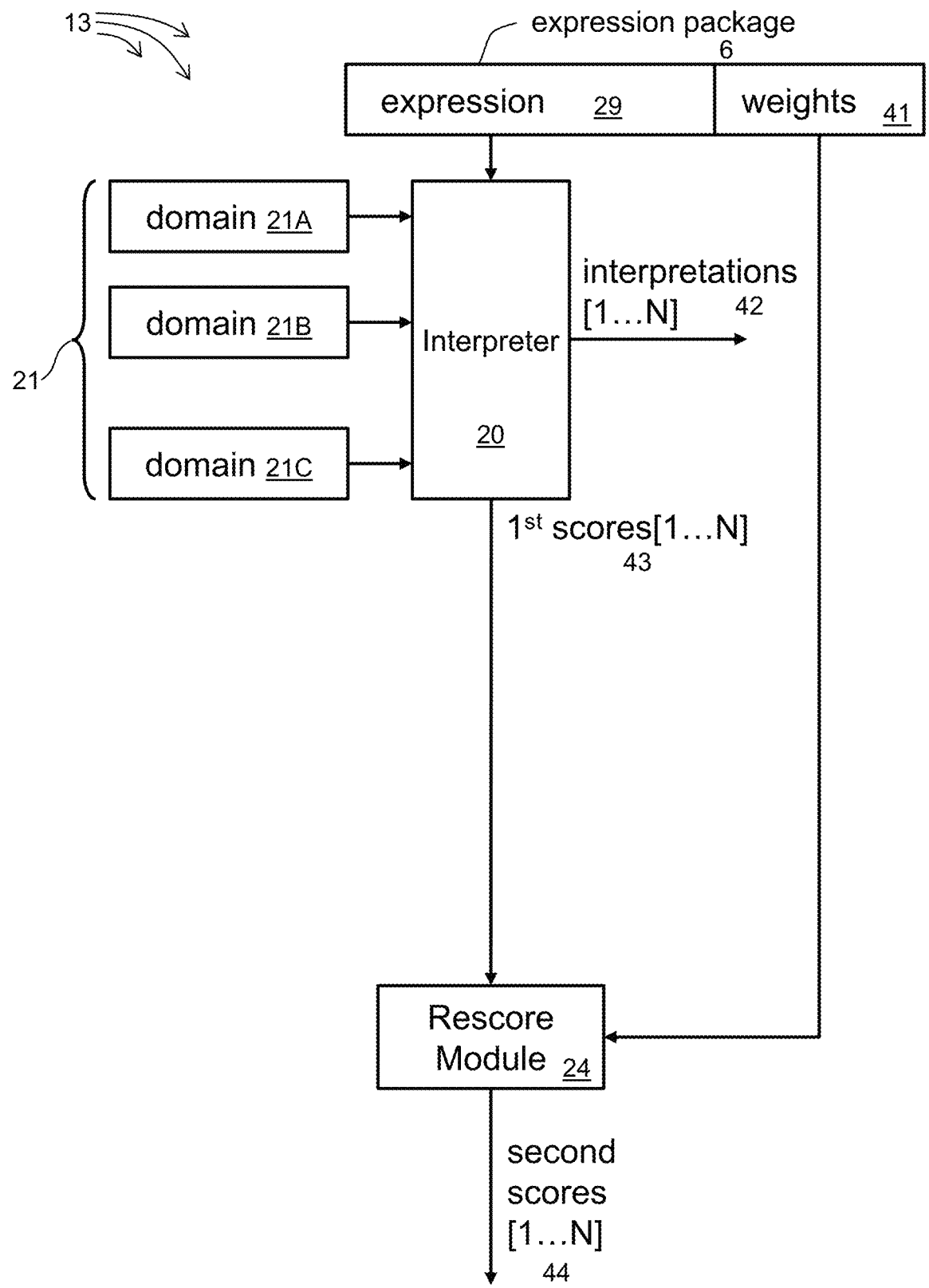
FIG. 3 illustrates another example of interpreting an expression at a multi-domain natural language understanding (NLU) interpreting server.

FIG. 3 illustrates another more detailed view of multi-domain natural language understanding (NLU) interpreting server 13. Multi-domain natural language understanding (NLU) interpreting server 13 can receive expression package 6 from a client device, such as, for example, from any of smart speaker, 12, mobile phone 14, or automobile 15. Multi-domain natural language understanding (NLU) interpreting server 13 forwards expression 29 to interpreter 20 and forwards weights 41 to rescore module 24. Interpreter 20 interprets expression 29 according to each of domains 21 (e.g., domain 21A, domain 21B . . . domain 21N) to produce interpretations 42 1-N. In some aspects, interpreter 20 produces interpretations for less than all of domains 21. Interpreter 20 also produces first scores 43 1-N. Each of first scores 43 corresponds to one of interpretations 42. In some aspects, scoring is performed prior to completing interpretations of expression 29. Scoring prior to interpretation can save processing resources. Interpreter 20 can send first scores 43 1-N to rescore module 24.

In one aspect, the client device that received expression 29, sends (per-expression) weights 41 as metadata along with expression 29 to multi-domain natural language understanding (NLU) interpreting server 13. Multi-domain natural language understanding (NLU) interpreting server 13 separates weights 41 from expression 19 and forwards weights 41 to rescore module 24. Weights 41 can include a weight for one or more or possibly all of domains 21. Weights in weights 41 can be represented as floating-point numbers, integers, text, or as other appropriate formats.

Rescore module 24 receives first scores 43 1-N from interpreter 20 and weights 41 from the client device. Rescore module 24 applies weights 41 to first scores 43 1-N to produce second scores 44 1-N. Rescoring can include multiplying a first score by a corresponding weight (or a value 1 for scores that have no associated weight) to produce a second score. Other rescoring mechanisms, such as addition, adding to logarithms, threshold comparisons, filtering, and application of arbitrary functions can also be used.

Based on second scores 44 1-N, multi-domain natural language understanding (NLU) interpreting server 13 can select an appropriate interpretation of expression 29 (e.g., an interpretation with the highest score, an interpretation that exceeds a threshold for a corresponding domain, etc.) from among interpretations 42 1-N. Based on the selected appropriate interpretation, multi-domain natural language understanding (NLU) interpreting server 13 can generate an appropriate response to expression 29. An appropriate response can include causing the client device to perform an operation, such as outputting text or audible messages, playing a song, playing a video, moving, etc.

Aspects also include combinations of stored weights and per-expression weights. Per-expression weights can be used to override or bias stored weights per domain for a client.

Expression Packages

Figure 4A:
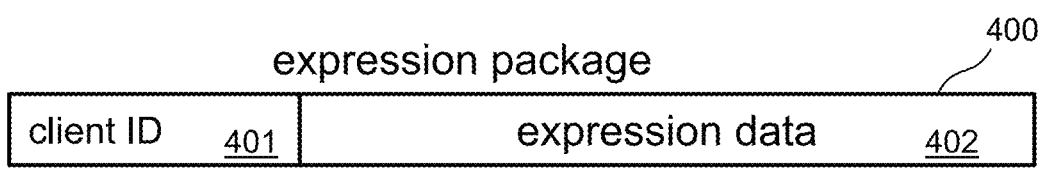
FIG. 4A illustrates an example expression package.

FIG. 4A illustrates an example expression package 400. Expression package 400 can be transferred from a client device to an NLU interpreting server. As depicted, expression package 400 includes client ID 401 and expression data 402. Client ID 401 can be transferred prior to expression data 402 to allow the NLU interpreting server chose a weight set before receiving expression data 402. A weight selector can use client ID 401 to select a weight set. A rescore module can apply weights in the selected weight set to first scores produced from interpreting expression data 402 across a plurality of domains.

Figure 4B:
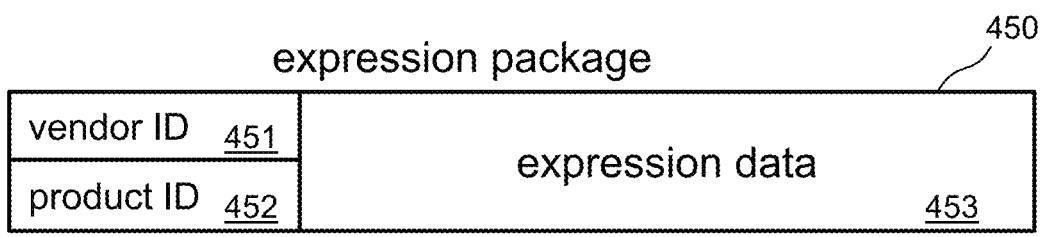
FIG. 4B illustrates another example expression package.

FIG. 4B illustrates another example expression package 450. Expression package 450 can be transferred from a client device to an NLU interpreting server. As depicted, expression package 450 includes vendor ID 451, product ID 452, and expression data 453. A weight selector can use vendor ID 451 and product ID 452 to select a weight set. A rescore module can apply weights in the selected weight set to first scores produced from interpreting expression data 453 across a plurality of domains.

Transferring vendor ID 451 and product ID 452 is useful for NLU interpreting servers that support an ecosystem of different companies with natural language clients. For example, an NLU interpreting server can offer per-vendor accounts along with different processing functions or software for different products and product versions from different vendors. Various other formats, such as, for example, a version, a user ID, a location, sensor information, etc. can also be appropriate for indicating ID information used to select an appropriate weigh set for expression data.

Figure 5A:
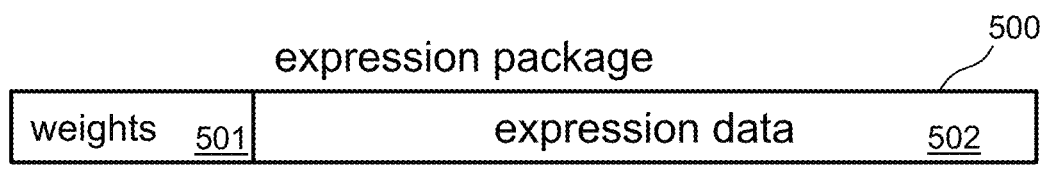
FIG. 5A illustrates an additional expression package.

FIG. 5A illustrates an additional expression package 500. Expression package 500 can be transferred from a client device to an NLU interpreting server. As depicted, expression package 500 includes weights 501 and expression data 502. Weights 501 can include a weight for each of one or more domains. A rescore module can apply weights in weights 501 set to first scores produced from interpreting expression data 502 across a plurality of domains.

Figure 5B:
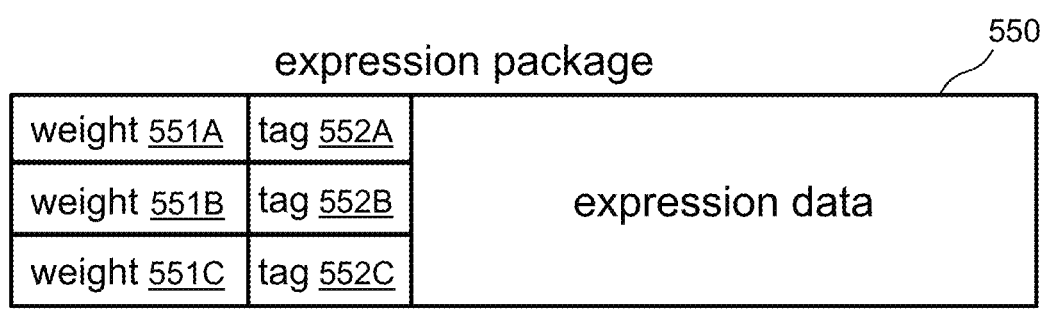
FIG. 5B illustrates a further expression package.

FIG. 5B illustrates a further expression package 550. Expression package 550 can be transferred from a client device to an NLU interpreting server. As depicted, expression package 550 includes weights 551A, 551B, 551C, corresponding tags 552A, 552B, and 552C respectively, and expression data 550. Each of tags 552A, 552B, and 552C indicate a domain to which a corresponding weight 551A, 551B, and 551C respectively is applicable. A rescore module can apply weights 551A, 551B, and 551C to first scores for domains indicated by tags 552A, 552B, and 552C respectively. The rescore module can apply a neutral weight (e.g., a value of 1 for multiplicative rescoring) to any domains not expressly indicated in expression package 550.

Additional Functionality

As described, expression data can take a variety forms including ASCII character strings, Unicode character strings, a sequence of digital audio samples representing speech, a sequence of gestures, and patterns of neural activity.

Figure 6:
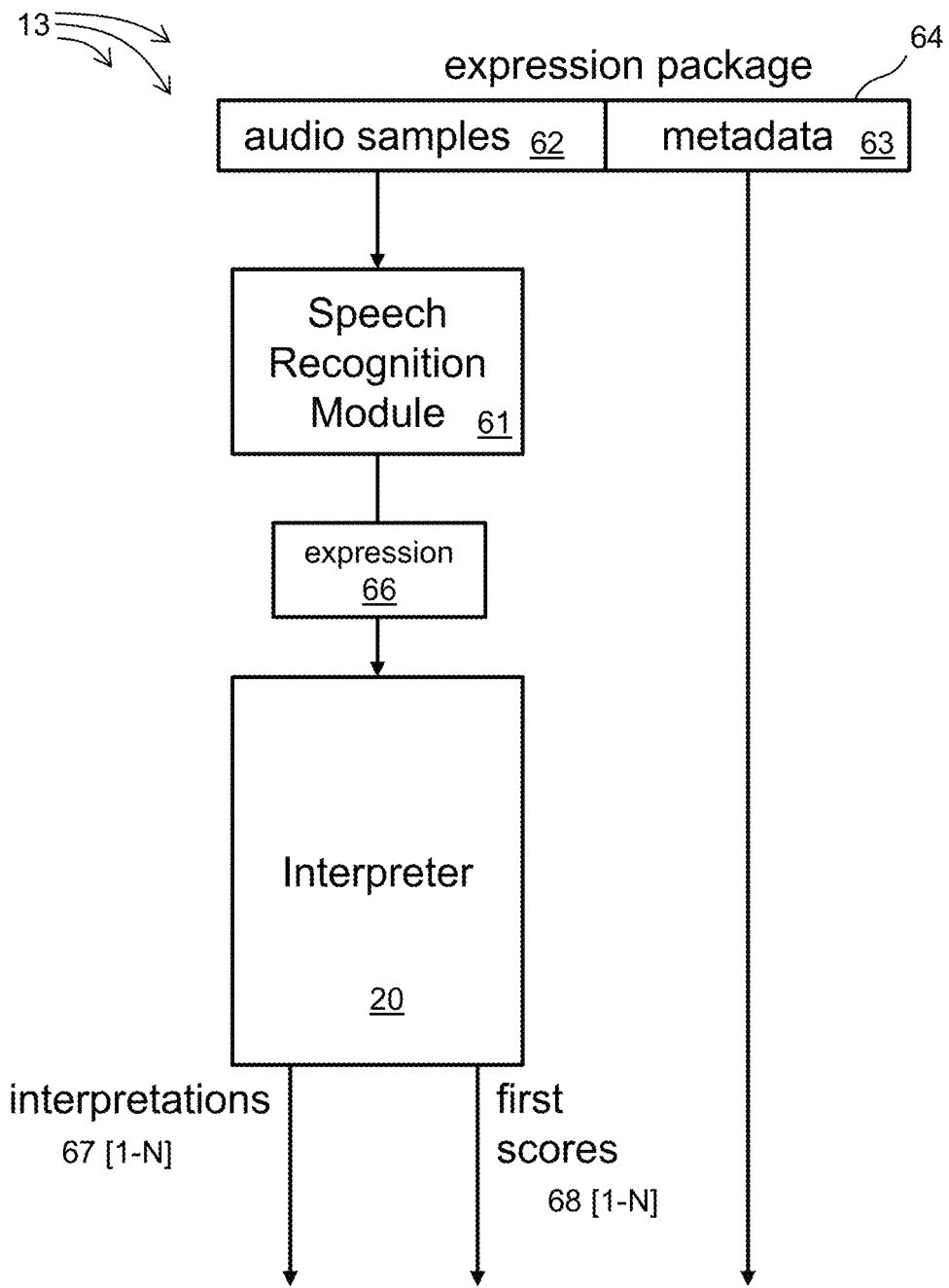
FIG. 6 illustrates an example of interpreting audio samples at a multi-domain natural language understanding (NLU) interpreting server.

FIG. 6 illustrates an additional more detailed view of multi-domain natural language understanding (NLU) interpreting server 13. Multi-domain natural language understanding (NLU) interpreting server 13 can receive expression package 64 from a client device, such as, for example, from any of smart speaker, 12, mobile phone 14, or automobile 15. Multi-domain natural language understanding (NLU) interpreting server 13 forwards audio samples 62 to speech recognition module 61 and forwards metadata 63 to weight selector 23 and/or to rescore module 24 as appropriate.

Speech recognition module 61 performs speech recognition on audio samples 62 to produce expression 66 (a text representation of audio samples 62). Speech recognition module 61 can produce a set of multiple hypotheses of recognized sequences of speech tokens. A speech recognition accuracy estimate score can be computed for each hypothesis. Expression 66 can include ASCII characters, Unicode characters, such as ones including Chinese characters, or other lexical or ideographical representations of audio samples 62.

Speech recognition module 61 can send expression 66 to interpreter 20. Interpreter 20 can interpret expression 66 according to each of domains 21 (e.g., domain 21A, domain 21B . . . domain 21N) to produce interpretations 67 1-N. In some aspects, interpreter 20 produces interpretations for less than all of domains 21. Interpreter 20 also produces first scores 68 1-N. Each of first scores 68 corresponds to one of interpretations 67. In some aspects, scoring is performed prior to completing interpretations of expression 66. Scoring prior to interpretation can save processing resources. Interpreter 20 can send first scores 68 1-N to rescore module 24.

Rescore module 24 receives first scores 68 1-N from interpreter 20 and corresponding weights. The corresponding weights can be included in metadata 63 and/or accessed from storage based on metadata 63. Rescore module 24 applies the weights to first scores 68 1-N to produce second scores. Rescoring can include multiplying a first score by a corresponding weight (or a value 1 for scores that have no associated weight) to produce a second score. Other rescoring mechanisms, such as addition, adding to logarithms, threshold comparisons, filtering, and application of arbitrary functions can also be used.

Based on the second scores, multi-domain natural language understanding (NLU) interpreting server 13 can select an appropriate interpretation of expression 66 (e.g., an interpretation with the highest score, an interpretation that exceeds a threshold for a corresponding domain, etc.) from among interpretations 67 1-N. Based on the selected appropriate interpretation, multi-domain natural language understanding (NLU) interpreting server 13 can generate an appropriate response to audio samples 62. An appropriate response can include causing the client device to perform an operation, such as outputting text or audible messages, playing a song, playing a video, moving, etc.

Figure 7:
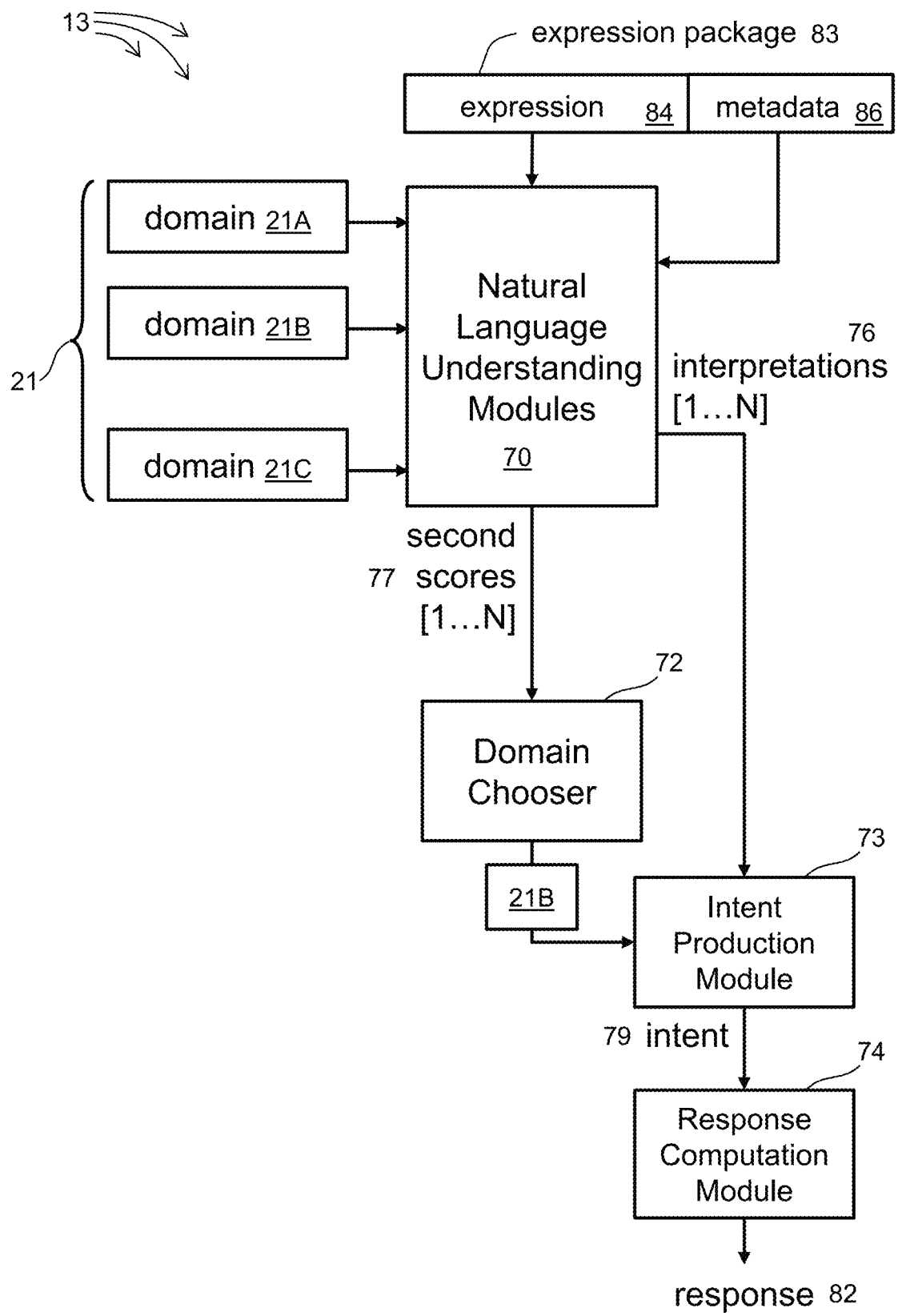
FIG. 7 illustrations an example of generating a response to an expression at a multi-domain natural language understanding (NLU) interpreting server.

FIG. 7 illustrates a further more detailed view of multi-domain natural language understanding (NLU) interpreting server 13. Multi-domain natural language understanding (NLU) interpreting server 13 can receive expression package 83 from a client device, such as, for example, from any of smart speaker, 12, mobile phone 14, or automobile 15. Multi-domain natural language understanding (NLU) interpreting server 13 forwards expression 84 and metadata 86 to natural language understanding modules 70.

As depicted, natural language understanding modules 70 receives expression package 83, including expression 84 and metadata 86. Natural language understanding modules 70 can include the functionality of any of interpreter 20, weight selector 23, and rescore module 24. Based on expression 84 and metadata 86, natural language understanding modules 70 can produce interpretations 76 1-N (of expression 84) and corresponding second scores 77 1-N respectively for domains 21.

Natural language understanding modules 70 can send second scores 77 1-N to domain chooser 72 and interpretations 76 1-N to intent production module 73. Domain chooser 72 can receive second scores 77 1-N from natural language understanding modules 70. Based on second scores 77 1-N, domain chooser 72 can choose domain 21B as the domain appropriate for expression 84. Domain chooser 72 can indicate domain 21B to intent production module 73. Intent production module 73 can receive the indication of domain 21B from domain chooser 72 and can receive interpretations 76 1-N from natural language understanding modules 70.

Based on the indication of domain 21B and interpretations 76 1-N, intent production module 73 can produce intent 79. Intent 79 can be a hypothesis with respect to a user's meaning for creating expression 84, such as, for example, to look-up information, to perform an action, etc. In one aspect, intent 79 is an appropriate data structure, such as, for example, represented with JavaScript object notation (JSON) or a set of web application programming interface (API) request arguments. Intent production module 73 can send intent 79 to response computation module 74.

Response computation module 74 can receive intent 79 from intent production module 73. Based on intent 79, response computation module 74 can compute response 82 (a response to expression 84). Response 82 can indicate information is to be returned to a user, an action is to be performed, etc. Response 82 can include text, audio, speech audio, marked up code for text-to-speech (TTS), or other appropriate forms.

Platform User Interfaces

Aspects of the invention can provide a platform for client developers to configure the availability of domains to their client users and to configure sets of rescoring weights for the available domains. Domain choices and weights can be entered through a text-based interface, a graphical user interface (GUI), or using other methods. FIG. 8 illustrates an example GUI configurator screen 81.

GUI configuration screen 81 includes a title "myClient-Project" along with various columns for configuring domain information. GUI configuration screen 81 represents each domain as a row with columns for enabling/disabling the domain, a domain weight, a domain name (e.g., Weather, Date/Time, Timer, Calendar, etc.), and a domain description (describing what the domain does). A scroll bar can be used to scroll up or down the list of domains.

Domains can be enabled and disabled by toggling a user-interface control (e.g., a checkbox) in the enable column. Interpreter 20 can interpret an expression in domains that are enabled. Interpreter 20 does not interpret the expression in domains that are disabled. Disabling domains can conserve computing resources, avoid costs associated with more expensive domains, avoid access to domains associated with information that might lead users away from desired actions (e.g., purchases), and prevent generation of inappropriate responses that might degrade user experience.

Weights can be entered into a text field in the weight column. GUI configuration screen 81 can allow weights to be entered for each domain or just for enabled domains. Weights can be floating point numbers appropriate for multiplicative rescoring, integers appropriate for multiplicative rescoring, integers representing exponents for rescoring values, text-based descriptions such as "low", "medium", and "high", or represented in various other appropriate ways. In GUI configuration screen 81 weights are expressed as values from 0.1 to 9.9. Rescoring can include multiplying a first score by a weight to compute a second score. First scores can be normalized so that weights provide system appropriate preferences for each domain.

As depicted, GUI configuration screen 81 indicates higher weights for the navigation and music domain but a lower weight for the Wikipedia domain. The depicted configuration of weights may be appropriate for an automobile client with a navigation system and radio. Wikipedia, which offers miscellaneous general knowledge, is a domain that automobiles should offer, but that is not frequently used by most passengers and therefore has a lower weight.

Domain Ranks

Another approach to improving the likelihood that a client appropriately responds to potentially ambiguous user queries is to rank domains. Domain ranking can be used separately from or in conjunction with domain weights. Domain weights and domain ranks are complementary ways of indicating domain priorities associated with natural language expressions.

Figure 9:
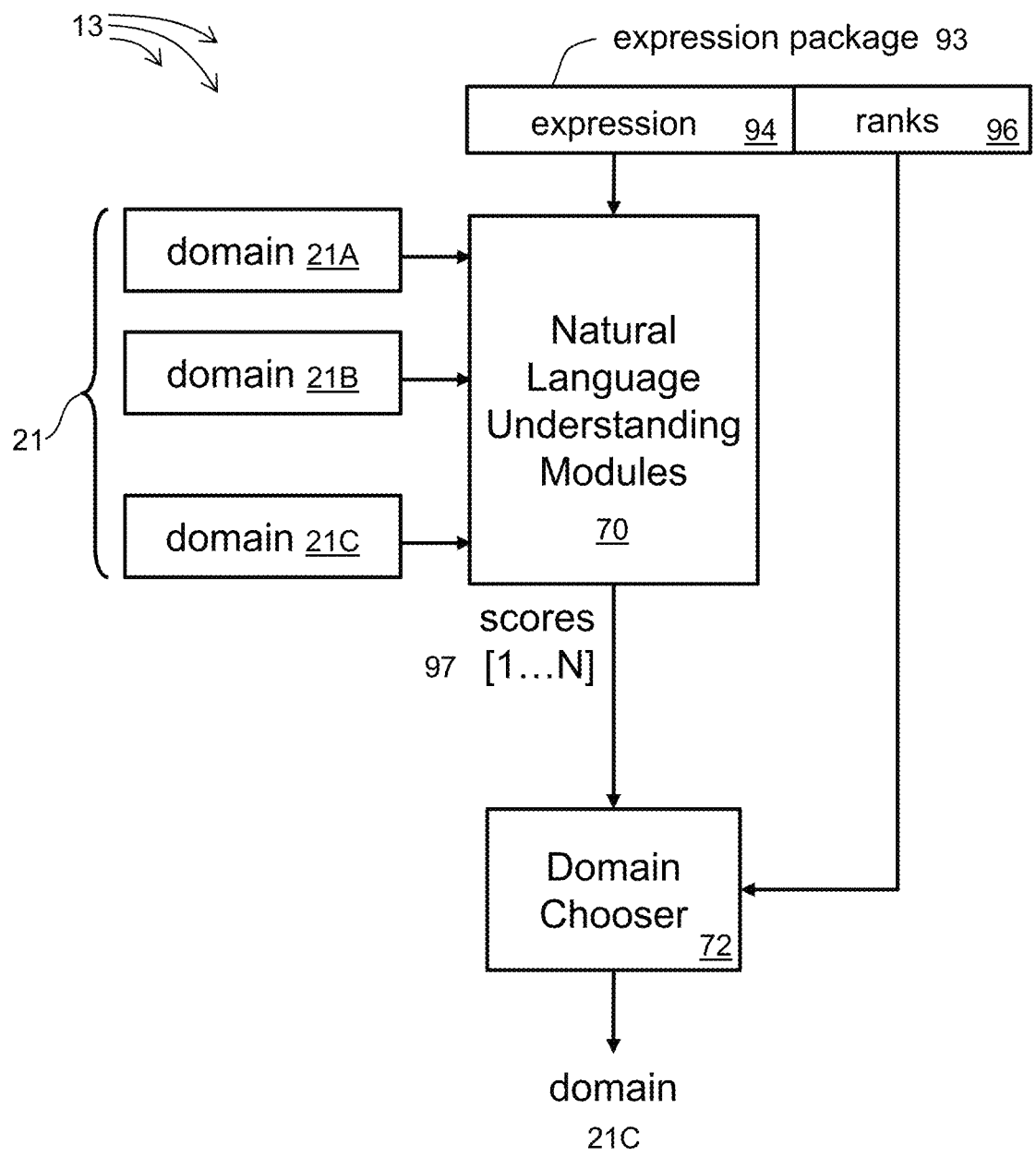
FIG. 9 illustrates an example of using domain ranks to select a domain at a multi-domain natural language understanding (NLU) interpreting server.

FIG. 9 illustrates a further additional more detailed view of multi-domain natural language understanding (NLU) interpreting server 13. As depicted, natural language understanding modules 70 receives expression package 93, including expression 94 and ranks 96. Multi-domain natural language understanding (NLU) interpreting server 13 can receive expression package 93 from a client device, such as, for example, from any of smart speaker, 12, mobile phone 14, or automobile 15. Multi-domain natural language understanding (NLU) interpreting server 13 forwards expression 94 to natural language understanding modules 70 and forwards ranks 96 to domain chooser 72.

As depicted, natural language understanding modules 70 receives expression 94. Based on expression 94, natural language understanding modules 70 can produce interpretations 1-N of expression 94 (not shown) and corresponding scores 97 1-N respectively for domains 21. Scores 97 1-N can be first scores (e.g., when domain ranks are used separately) or second scores (e.g., when domain ranks are used in combination with domain weights). Natural language understanding modules 70 can send scores 97 1-N to domain chooser 72. Natural language understanding modules 70 can send interpretations 1-N (not shown) to intent production module 73.

Domain chooser 72 can receive scores 97 1-N from natural language understanding modules 70. Domain chooser 72 can apply ranks 96 to scores 97 1-N. Based on ranks 96, domain chooser 72 can choose domain 21C as the domain appropriately aligned with expression 94. Domain chooser 72 can indicate domain 21C to intent production module 73. Intent production module 73 can receive the indication of domain 21C from domain chooser 72 and can receive interpretations from natural language understanding modules 70. Intent production module 73 can determine an intent, and response computation module 74 can use the intent to generate a response to expression 94.

In some aspects, domain ranks are carried as metadata in an expression package. In other aspects, domain ranks are stored, for example, in durable storage. In these other aspects, domain ranks carried as metadata can be used to override, bias, or reweight stored ranks.

Thus, it may be that a client sends domain ranks to an NLU interpreting server with an expression. For example, the following domain rankings:

"DomainRank": ["Movies", "Music", "Map"]

can be sent along with an expression to favor a Movies domain over a Music domain and favor the Movies domain and the Music domain over a Map domain.

In some embodiments, an NLU interpreting server computes a Boolean value for each of a number of domains for an expression. Per domain, the value represents whether or not the domain can interpret the expression. When multiple domains can interpret the expression, the NLU interpreting server can choose a domain appearing earliest in the DomainRank list. In the above example, the Movies domain is chosen if in competition with Music or Map and Music is chosen if in competition with Map.

In other embodiments, an NLU interpreting server computes a score for each of a number of domains for an expression. Per domain, the score represents how likely it is that the expression is appropriate for the domain. The expression can be indicated as appropriate for a domain when a score for the domain is above a score threshold. When multiple domains have a score above the threshold, the NLU interpreting server can choose a domain appearing earliest in the DomainRank list It may be that different domains have different score thresholds. For example, the following domain rankings:

"DomainRank": ["Movies":0.5, "Music":0.75, "Map": 0.6]

can be sent along with an expression. The domain rankings define a threshold of 0.5 for movies, a threshold of 0.75 for music, and a threshold of 0.6 for map. Thus, a score for the Movies domain has to be greater than 0.5, a score for the Music domain has to be greater than 0.75, and a score for the Map domain has to be greater than 0.6.

Specifying a DomainRank list is optional. If not present, a domain choice can be based on interpretation score. In some embodiments, the DomainRank list does not need to be a comprehensive list of enabled domains. Domains not specified in the DomainRank list have an effective rank of being below the lowest ranked domain on the list.

A client device can specify an order of the DomainRank list based on context. For example, a client device, such as, for example, a mobile phone, can include multiple applications. When the client device is running a map application in the foreground, a DomainRank can be changed to prioritize a Map domain. For example, the following domain rankings:

"DomainRank": ["Map", "Movies", "Music"]

can be used when a map application is in the foreground at a mobile phone.

Other Domain Indicators

In some aspects, a domain rank can have an indicator representing a plurality of domains, such as one with a reserved named OTHER. In some embodiments, an OTHER domain indication represents any domains not named in the DomainRank list. Using an OTHER domain is useful to highly prioritize a domain of interest when the domain of interest can interpret an expression. For example, the following domain rankings:

"DomainRank": ["CarControl", "OTHER"]

highly prioritizes a CarControl domain to provide an interpretation for any expression that uses the word "car".

However, such a configuration of a DomainRank list may also cause user frustration when a user intends for a different domain to interpret a potentially ambiguous expression. For example, the CarControl domain may be unable to satisfy a request to play music by a band named "The Cars". Such an approach may be suited for preferring domains with a relatively limited range of interpretations. The limitation can be further alleviated by indicating domain ranks with per-domain score thresholds. In such an embodiment, the CarControl domain threshold would be given a higher score threshold and OTHER a lower score threshold. Thus, chances are increased that other domains are chosen for user expressions if the user phrases the expression expressly for the intended OTHER domain.

An OTHER domain indication may also be useful to provide for a certain domain being a default. For example, the following domain rankings:

"DomainRank": ["OTHER", "Web"]

prioritizes any domain that can interpret an expression to be chosen, but if no other domain can interpret the expression, a Web domain is chosen by default. A score threshold can also be used for OTHER domains. The score threshold applies to domains not expressly listed in a DomainRank list.

1:1 Domain Comparison Rules

Aspects allow for separate expressions of pairs of domain ranks or multiple lists of relative domain ranks. This is useful if, for example, domain A is favored over domain C and domain B is favored over domain C but neither A nor B is favored over each other. In such a scenario, an ordered list would create a false ranking preference between domains A and B.

Client Stored Weights

In some aspects, a client stores weights in an array and transmits the contents of the array as domain weight metadata (e.g., weights 41) along with an expression (e.g., expression 29). When an event is detected, the array values can be updated. An event can be detected by execution of an interrupt service routine in a processor or by a polling routine. A weight update, in some cases, is a switch between two values based on a state of a Boolean condition. Updated weights in some cases are the result of an integer or floating-point output of any function of a measured value.

For example, in an automobile, if the windshield wipers are switched on, a weather domain weight is increased because users are more likely to make weather-related expressions when the weather is rainy compared to when it is not. In an automobile, a navigation domain weight is set high immediately after the navigation system gives a driver instruction, and gradually tapers down to a steady state value over a period of several seconds after that since users are more likely to make a navigation-related expression shortly after the navigation system gives an instruction.

As another example, a device can include a music-related app that can be opened or closed. When a music app opening event occurs, a music domain weight is increased. On the other hand, when a music app closing event occurs, the music domain weight is decreased (e.g., to a default value).

Physical Embodiments

Figure 10A:
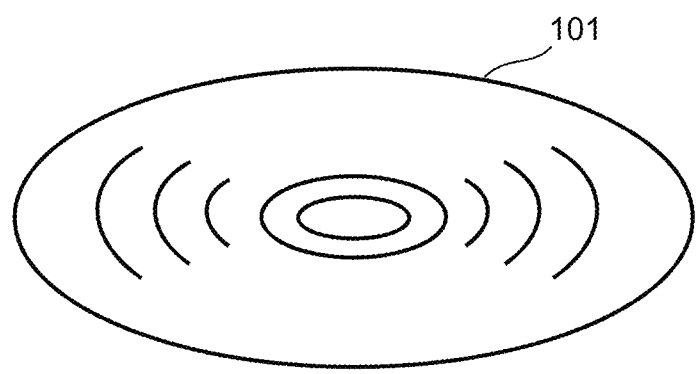
FIG. 10A illustrates an example rotating disk.
Figure 10B:
FIG. 10B illustrates an example Random Access Memory (RAM) chip.
Figure 11A:
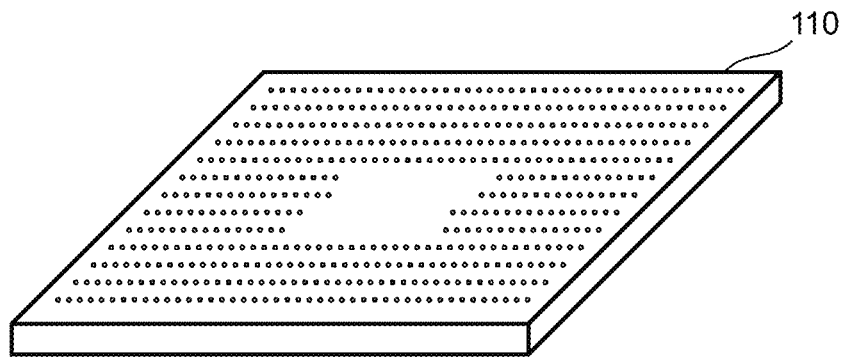
FIG. 11A illustrates an example solder ball side of a packaged System On Chip (SoC).
Figure 11B:
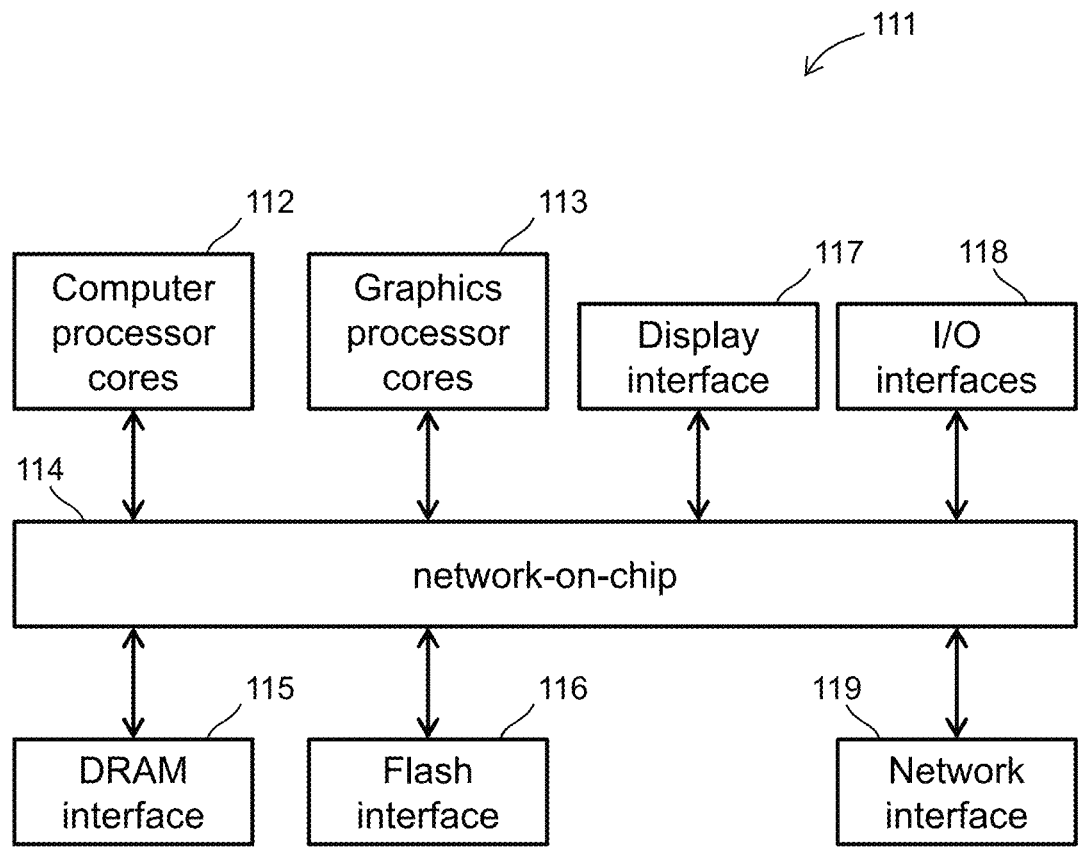
FIG. 11B illustrates an example architecture of a System On Chip (SoC).

Various embodiments are non-transitory computer readable media, servers, embedded internet-of-things (IoT) client devices controlled by system-on-chip (SoC) semiconductor devices, and method of the operation or usage of any of the above types of embodiments. FIG. 10A illustrates an example rotating magnetic disk non-transitory computer readable medium 101. Rotating optical disks and other mechanically moving storage media are possible. FIG. 10B illustrates an example (e.g., Flash) random access memory (RAM) chip non-transitory computer readable medium 102. Other non-moving storage media packaged with leads or solder balls are possible. Various embodiments of non-transitory computer readable media store computer code comprising instructions that, if executed by one or more computer processors would cause the one or more computer processors to perform the described method embodiments. Some embodiments are computer programs. Some embodiments comprise multiple storage media that work in conjunction with each other FIG. 11A illustrates solder ball side of a packaged SoC 110. Various package shapes and sizes are possible for various chip implementations. Many embedded systems and IoT devices function as clients and are controlled by SoC devices. FIG. 11B illustrates an example architecture of a SoC 111. As depicted, SoC 111 includes a multicore computer processor (CPU) 112, a multicore graphics processor (GPU) 113, display interface 117, I/O interfaces 118, dynamic random access memory (DRAM) interface 115, Flash interface 116, and network interface 119. The components communicate with one another over network-on-chip 114.

Multicore computer processor (CPU) 112 and multicore graphics processor (GPU) core 113 can connect through DRAM interface 115 to an external DRAM chip for volatile program and data storage. Multicore computer processor (CPU) 112 and multicore graphics processor (GPU) core 113 can also use Flash Interface 116 to connect to an external non-volatile Flash RAM non-transitory computer readable medium for computer program storage. Display interface 117 can provide for a display for showing a GUI and an input/output (I/O) interface 118 can provide an ability to connect to various I/O interface devices, as needed for different client devices. Client devices can include universal serial bus (USB) peripherals, Bluetooth peripherals, touch screens, audio analog to digital converters for microphones, power amplifier devices for driving speakers, global navigation system receiver interfaces, light emitting diode (LED) drivers, and interfaces to other sensors. Network interface 119 can provide access to WiFi, 3G, 4G long-term evolution (LTE), 5G, and other wireless interface standard radios as well as ethernet connection hardware.

Figure 12A:
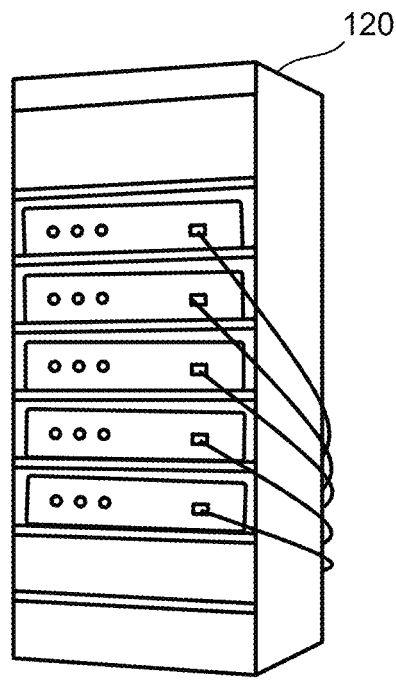
FIG. 12A illustrates an example of a racked based server.
Figure 12B:
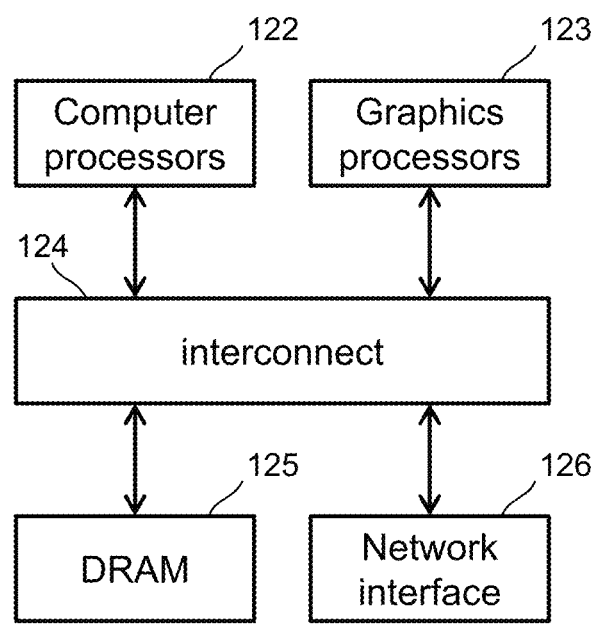
FIG. 12B illustrates an example architecture of a server.

FIG. 12A illustrates an example of a rack-based server 120. Rack-based server 120 can include an array of server blades, each connected to a network (e.g., the Internet). The server blades can include CPU and GPU processor chips, RAM chips, and network interface chips. FIG. 12B illustrates an architecture for an example server 121. Server 121 comprises a multi-core CPU chip 122 and a multicore GPU chip 123 that communicates through an interconnect 124 with a DRAM chip 125 for volatile program and data storage and a network interface chip 126 for communicate with local and internet networks.

In general, described components can be connected to one another over (or be part of) a network, such as, for example, a personal area network (PAN), a local area network (LAN), a wide area network (WAN), and even the Internet. Accordingly, the described components as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Any of the described devices, servers, components, speakers, phones, automobiles, interpreters, selectors, modules, choosers, etc., can be implemented on the hardware components described in FIGS. 10A-12B.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. A method performed by a multi-domain natural language understanding (NLU) interpreting server comprising:
    receiving a query and a domain preference from a client device, wherein the client device is one of a smart speaker, mobile phone, automobile, or vending machine, wherein the domain preference is stored as a weighted graph representing domain relationships and priorities;
    interpreting the query according to a plurality of domains to produce a plurality of interpretations, wherein each interpretation is associated with a confidence score;
    identifying a preferred interpretation from the plurality of interpretations by traversing the weighted graph to adjust the confidence scores of each domain based on the domain preference, said identification of the preferred interpretation increasing an accuracy of domain selection for ambiguous queries compared to a system without domain preferences; and
    providing a query response for the preferred interpretation to the client device.

2. The method of claim 1 wherein providing a query response comprises invoking an action.

3. The method of claim 1 wherein providing a query response comprises providing a visual response or an audible response.

4. The method of claim 1, wherein the domain preference includes an identifier.

5. The method of claim 4 wherein the identifier indicates a type of client device.

6. The method of claim 4 wherein the identifier indicates a make of automobile.

7. The method of claim 4 wherein the identifier indicates which application is running in the foreground of a client device.

8. The method of claim 1, wherein providing the query response comprises invoking an action.

9. The method of claim 1, wherein providing a query response comprises providing a visual response or an audible response.

10. A method performed by a multi-domain natural language understanding (NLU) interpreting server comprising:
    receiving a query and an identifier from a client device, wherein the client device is one of a smart speaker, mobile phone, automobile, or vending machine;
    referencing a numerical weight value indicated by the identifier;
    interpreting the query according to a domain to produce an interpretation and a score;
    adjusting the score by the numerical weight value to compute a weighted score;
    comparing the weighted score to a determined threshold; and
    providing a query response in dependence upon the weighted score exceeding the threshold to the client device.

11. The method of claim 10 wherein the threshold is a second weighted score for a second domain.

12. The method of claim 10 wherein the identifier indicates a type of client device.

13. The method of claim 10 wherein the identifier indicates a make of automobile.

14. The method of claim 10 wherein the identifier indicates which application is running in the foreground of a client device.

15. The method of claim 10 wherein providing the query response comprises invoking an action.

16. The method of claim 10 wherein providing a query response comprises providing a visual response or an audible response.

* * * * *